April 5, 1932.  J. W. LEIGHTON  1,852,318
SHACKLE FOR MOTOR VEHICLES
Filed July 9, 1931

Inventor
John W. Leighton

Patented Apr. 5, 1932

1,852,318

UNITED STATES PATENT OFFICE

JOHN WYCLIFFE LEIGHTON, OF PORT HURON, MICHIGAN

SHACKLE FOR MOTOR VEHICLES

Application filed July 9, 1931. Serial No. 549,695.

The principal objects of this invention are to produce a shackle which will materially reduce the number of parts and therefore effectively lessen the number of wearing surfaces to become loose and subject to side play and to provide a construction which will lessen both the cost of construction and of installation and which will enable the maintenance of very effective lubrication.

The principal feature of the invention consists in the novel construction of a shackle member formed of a unitary piece of metal U-shaped in form and having threaded ends engaging correspondingly threaded bushings secured in the vehicle frame and spring ends.

A further important feature consists in the novel construction of the bushings threaded on to the threaded ends of the shackle member and having closed ends provided with suitable lubricating fittings.

In the accompanying drawings, Figure 1 is a side elevational view showing my improved shackle applied to the frame hanger and spring eye of a vehicle.

Figures 1, 2, 3:
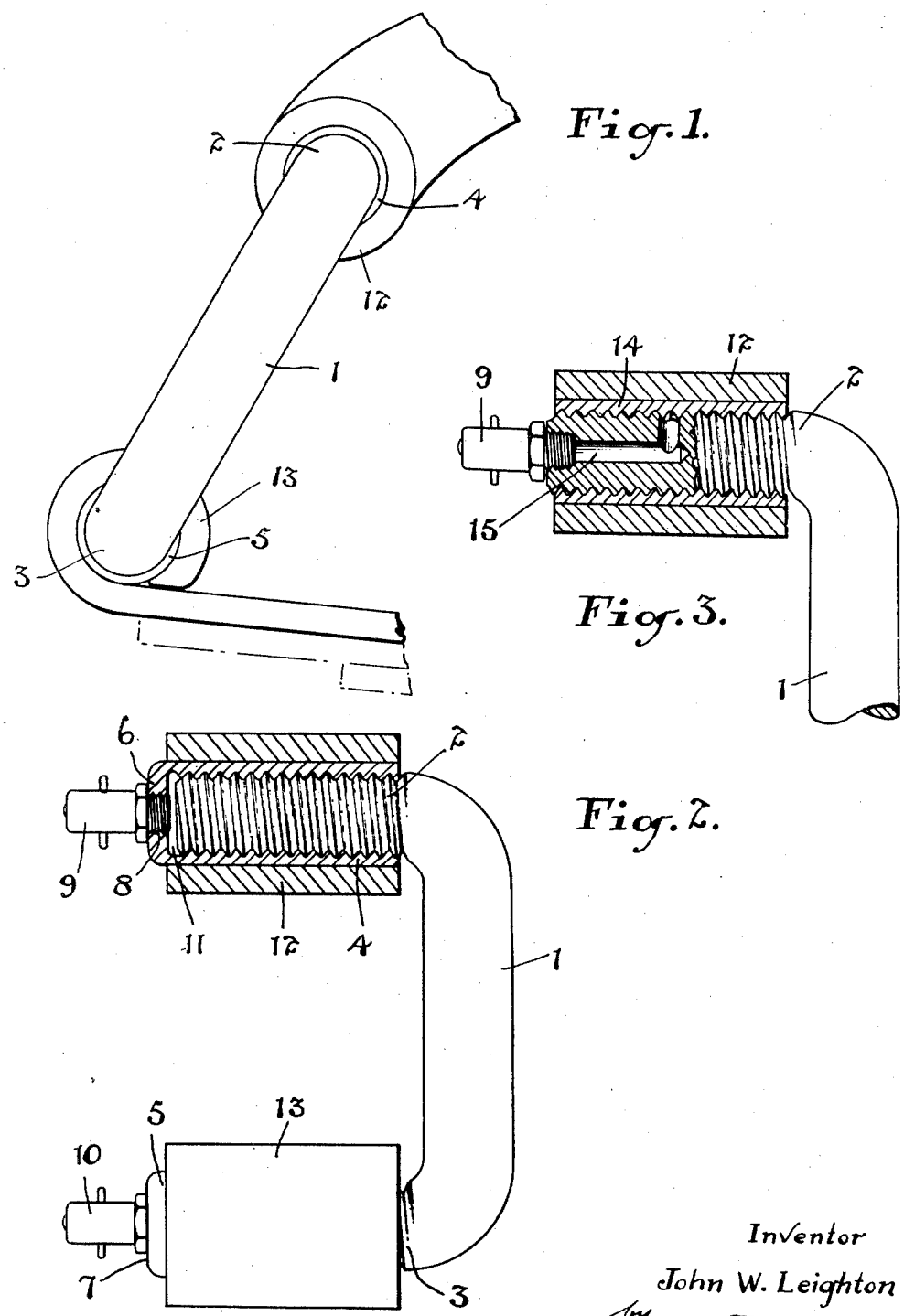
Figure 2 is a side elevational view of a shackle, showing the eye of the hanger and the bushing in longitudinal section.
Figure 3 is a longitudinal sectional view of a modified construction of shackle and bushing.

According to practical automotive construction it has been the practice to press bushings into the spring eyes and into the eyes of the frame hangers and journalled in these bushings are shackle bolts and shackle plates or bars are secured on both ends of the shackle bolts at either side of the eyes.

The shackle, as is well known, is subject to considerable lateral stress in both directions in the travelling of the car over the road and it is commonly known that this condition, both in regard to construction and road wear, makes it difficult to maintain a proper fit so as to keep the shackle from loose play and rattling. Also it is well known that it is extremely difficult to maintain lubrication.

In the construction herein shown the shackle member 1 is formed of a single length of steel bar, preferably round, and it is bent into a U-shape and the right angle bent ends 2 and 3 are threaded preferably with the Whitworth type thread.

Bushings 4 and 5 are mounted respectively on the ends 2 and 3 of the shackle members, being threaded internally in a loose turning fit. These bushings are preferably closed at one end to enclose the ends 2 and 3 of the shackle and the closed ends 6 and 7 of said bushings have threaded orifices 8 in the ends thereof in which are inserted suitable lubrication fittings 9 and 10.

It will be seen that oil or grease injected through the fittings 9 and 10 will fill in the space 11 between the end of the shackle and the inner wall of the closed end of the bushing and it will also be forced around the loose fitting threads.

Threaded bushings have been previously used and no claim is made to the fact of threading a shackle bolt and a bushing but to provide a single piece shackle bolt with threaded ends upon which bushings are threaded, is believed to be an entirely new structure.

The bushings as herein shown are inserted into the hanger and spring eyes 12 and 13 with a pressed or shove fit and this operation is performed in an extremely simple manner. The bushings are first mounted on the shackle, then the ends of both bushings are inserted in the respective eyes and are pressed into place in a single operation. Suitable locking means may be provided when a shove fit is used.

It will be readily appreciated that a shackle constructed as described may be manufactured at much lower cost than the ordinary type, its assembly and placing into operative position can be accomplished at very much less cost than the ordinary shackle and when in place it is extremely rigid and efficient and dispenses entirely with fine adjustments and servicing in the operation of the vehicle.

The modified form of the invention illustrated in Figure 3 consists in the bushing 14 being open at both ends and the shackle is provided with a bored hole 15 leading inward from the lubrication fitting to supply lubricant to the threaded bearing surfaces.

This construction of the device is assembled in exactly the same manner as is the one previously described.

What I claim as my invention is:

1. In a spring shackle, the combination with the spring end and hanger, of a unitary metal shackle member having a pair of parallel threaded extensions, and threaded bushings rotatably mounted on said extensions and non-rotatably held in said spring end and hanger and supporting said shackle member in a free swinging position.

2. In a spring shackle, the combination with the spring end and hanger, of a U-shaped metal member, the end members of which are parallel and threaded, and threaded bushings rotatably mounted on the parallel ends of said U-shaped member and secured from endwise or rotative movement in said spring end and hanger.

3. In a shackle, the combination with the spring end and hanger, of a U-bolt having a pair of parallelly arranged threaded ends, bushings threaded on the threaded ends of said U-bolt and rigidly secured in said hanger and spring end and rotatable thereon, and means for directing a lubricant between the threaded surfaces of the bushing and the shackle member.

4. A shackle comprising a unitary metal member having a pair of parallelly arranged threaded ends, bushings each closed at one end and threaded on to the threaded ends of said member, and means for directing a lubricant to the interior of said bushing to lubricate the threaded bearing surfaces.

5. In a shackle, the combination with a spring end and hanger, of a unitary metal shackle member having the parallel ends thereof threaded, and bushings threaded on to the threaded ends of said U-shaped member and inserted into said spring eye and hanger, said bushings each having a closed end adapted to support the bushing against distortion.

6. In a vehicle, the combination with the spring eye and hanger, of a unitary metal member having a pair of parallel threaded extensions, bushings rotatably threaded on to said threaded extensions and non-rotatably secured in said hanger and spring eye and forming a free swinging connection open at one side between the hanger and spring eye.

7. In a spring shackle, the combination with the spring end and hanger, of a unitary metal shackle member having a pair of parallel threaded extensions, and threaded bushings rotatably mounted on said extensions and non-rotatably secured in said spring end and hanger by a pressure fit and supporting said shackle member in a free swinging position.

8. In a spring shackle, the combination with the spring end and hanger, of a U-bolt shackle member having parallel threaded ends, and threaded bushings rotatably mounted on said extensions and non-rotatably secured in said spring end and hanger and locking said U-bolt in a free swinging position with the portion connecting the threaded ends free of contact with the bushing ends, spring end or hanger.

JOHN WYCLIFFE LEIGHTON.